(12) United States Patent
Langford et al.

(10) Patent No.: US 6,625,973 B1
(45) Date of Patent: Sep. 30, 2003

(54) LOCK MECHANISM

(75) Inventors: David John Langford, Wolverhampton (GB); John Herbert Harvey, Wolverhampton (GB); Tony Jones, Birmingham (GB); Michael Paul Somerfield, Stoke-on-Trent (GB); Melanie Zoe Brown, Wolverhampton (GB)

(73) Assignee: Lucas Industries Limited (GB)

( * ) Notice: Subject to any disclaimer, the term of this patent is extended or adjusted under 35 U.S.C. 154(b) by 0 days.

(21) Appl. No.: 10/081,131

(22) Filed: Feb. 22, 2002

(30) Foreign Application Priority Data

Mar. 21, 2001 (GB) ............................................. 0107023
Feb. 23, 2001 (GB) ............................................. 0104565

(51) Int. Cl.⁷ ................................................. F02K 3/02
(52) U.S. Cl. ..................... 60/226.2; 60/39.091; 292/207
(58) Field of Search .................. 6/226.2, 230, 39.091; 292/207

(56) References Cited

U.S. PATENT DOCUMENTS 5,280,704 A * 1/1994 Anderson et al. .......... 60/226.2
6,138,449 A * 10/2000 Hudson ....................... 60/223
6,145,786 A 11/2000 Baudu et al. ........... 244/110.13

FOREIGN PATENT DOCUMENTS

| EP | 0 536 954 | 4/1993 |
| EP | 0 801 221 | 10/1997 |
| FR | 2 706 536 | 12/1994 |
| GB | 0 506 277 A1 * | 3/1992 |
| GB | 0 801 221 A2 * | 10/1997 |
| GB | 1 236 881 A1 * | 9/2002 |

* cited by examiner

Primary Examiner—Charles G. Freay
Assistant Examiner—Han L Liu
(74) Attorney, Agent, or Firm—Andrus, Sceales, Starke & Sawall (57) ABSTRACT

A thrust reverser actuator lock mechanism comprising a rotatable shaft, rotation of which in one direction from a rest position drives an associated thrust reverser from a stowed position towards an operative position in use, retractable abutment means having a rest position abutting an element rotatable with the shaft to prevent rotation of the shaft, resilient means urging said abutment means to said rest position, and, mechanical latch means sensitive to the speed of rotation of said shaft for latching said abutment means in a retracted position against the action of said resilient means when the rotational speed of said shaft exceeds a predetermined value.

21 Claims, 5 Drawing Sheets

LOCK MECHANISM

This invention relates to a lock mechanism for an aircraft engine thrust reverser, particularly a lock mechanism which can form part of the drive train of a thrust reverser actuator.

Figure 1:
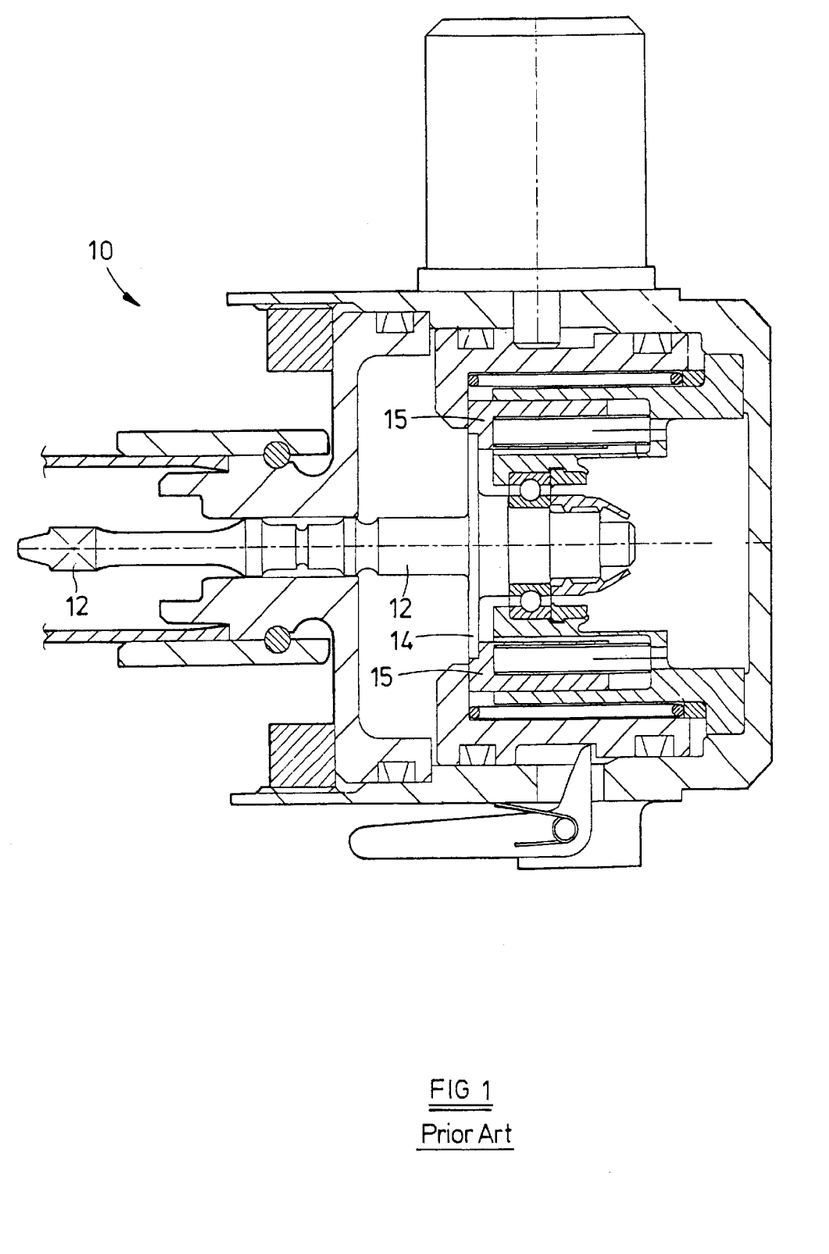
FIGS. 1 and 2 illustrate a known thrust reverser actuator lock mechanism of the kind disclosed in U.S. Pat. No. 6,138,449.
Figure 2:
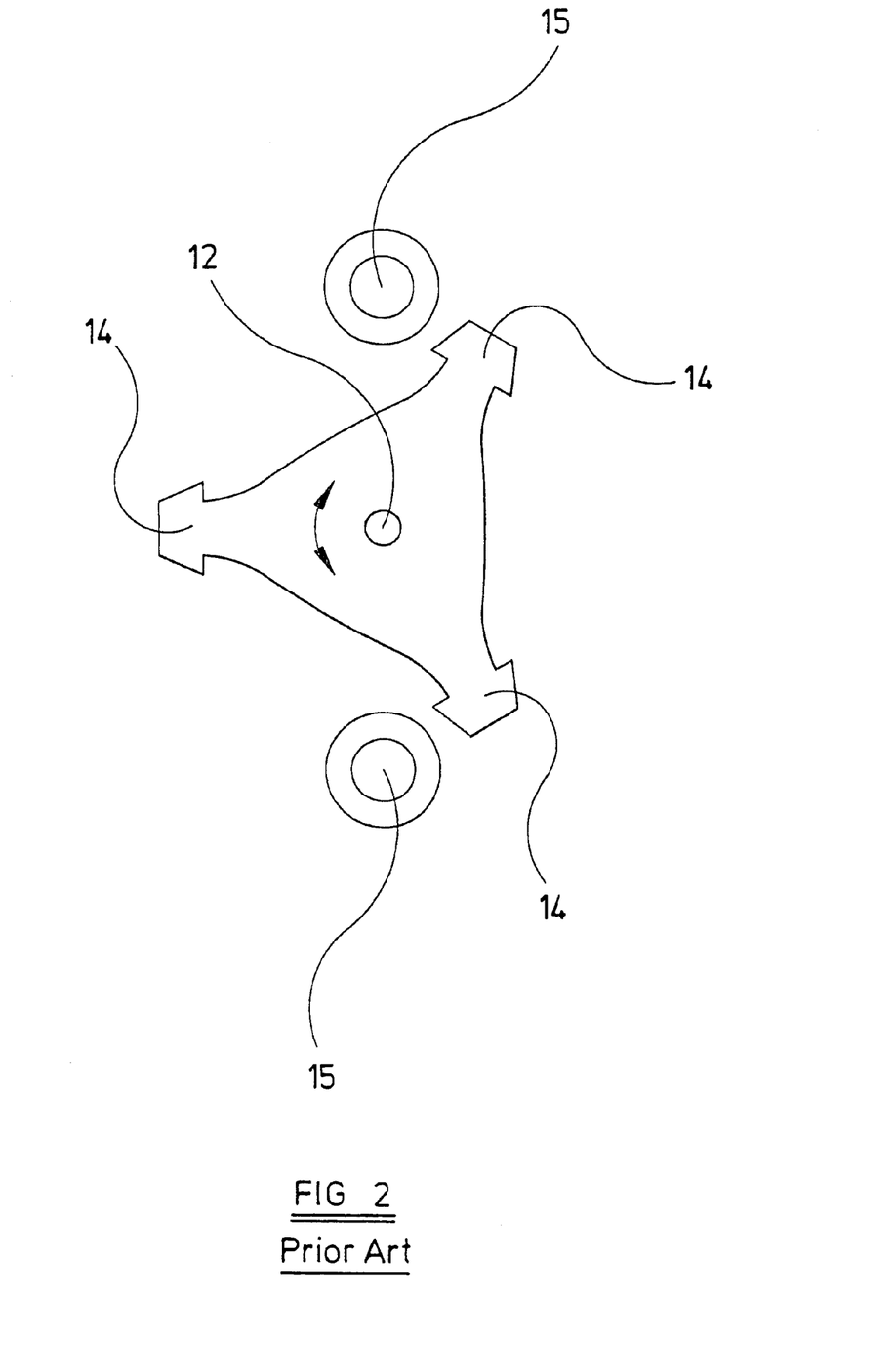

An aircraft engine's thrust reverser must only be deployed when the aircraft has landed. In order to avoid premature or other inadvertent deployment of the thrust reverser a locking system is provided for locking the thrust reverser cowl or other thrust reverser element in a stowed position. Part of the locking system can be a lock which prevents operation of the thrust reverser actuating mechanism. Our U.S. Pat. No. 6,138,449 discloses an hydraulically operated lock mechanism for locking an aircraft engine thrust reverser actuating mechanism against operation. The lock mechanism of FIG. 1 of U.S. Pat. No. 6,138,449 has, as shown in FIGS. 1 and 2 hereto, a shaft 12 which, in order to operate the thrust reverser actuating mechanism, is rotated at speeds up to 6,000 revolutions per minute by a prime mover, which, in the case of the mechanism illustrated in U.S. Pat. No. 6,138,449, will be an hydraulic motor. The shaft 12 can be locked against movement by first and second pins 15 which are spring urged to a position in which they obstruct the path of rotation of a plurality of radial arms 14 carried by the shaft 12. When it is safe and appropriate to actuate the thrust reverser mechanism of the engine the pins 15 are retracted hydraulically so that they do not obstruct the arms 14 and the shaft 12 can thus rotate.

A potential problem of the mechanism described in U.S. Pat. No. 6,138,449, but which is extremely unlikely to arise in use, is that if the hydraulic supply to the retraction mechanism of the pins 15 fails then the pins 15 can be driven forward at a time when the shaft 12 is rotating at up to 6,000 revolutions per minute. If this happens then firstly there is a risk that the pins and/or the arms 14 will be irreparably damaged, and secondly there is a possibility that the shaft 12 will be arrested during rotation while deploying or stowing the thrust reverser mechanism. The possibility of such an interruption in the hydraulic supply to the retraction mechanism of the pins 15 is extremely remote.

There is currently a requirement for electrically operated thrust reverser systems, and accordingly for electrically operated locking mechanism associated with such thrust reverser systems. It is a requirement of the lock mechanism that it is operable to lock the thrust reverser in a stowed position until released by an electrical signal, and thereafter, irrespective of interruption of the electrical energisation, the locking mechanism must not be rendered operative unless the thrust reverser mechanism has been returned to its fully stowed condition. It will be recognised that in order to produce an electrically operated version of the lock mechanism illustrated in U.S. Pat. No. 6,138,449 it would be possible, at least in theory, to replace the hydraulic retraction mechanism of the pins 15 by an electromagnetic retraction mechanism. However, in the theoretical electrical version of the arrangement illustrated in 6,138,449 it is recognised that the risk of inadvertent momentary interruption of an electrical supply to an electromagnetic retraction mechanism is somewhat greater than the risk of a dangerous interruption in the hydraulic supply. In solving this difficulty the inventors have produced an arrangement which is suitable for use with electrical or hydraulic operation and accordingly it is an object of the present invention to provide a lock mechanism for a thrust reverser which cannot be actuated by inadvertent interruption of the supply of either electrical or hydraulic power.

In accordance with the present invention there is provided a thrust reverser actuator lock mechanism comprising a rotatable shaft, rotation of which in one direction from a rest position drives an associated thrust reverser from a stowed position towards an operative position in use, retractable abutment means having a rest position abutting an element rotatable with the shaft to prevent rotation of the shaft, resilient means urging said abutment means to said rest position, and, mechanical latch means sensitive to the speed of rotation of said shaft for latching said abutment means in a retracted position against the action of said resilient means when the rotational speed of said shaft exceeds a predetermined value.

Preferably said mechanical latch means co-operate with said abutment means in such a manner that when said latch means latches said abutment means in said retracted position the abutment means must be retracted beyond said latched position and the speed of rotation of the shaft must be below said predetermined value in order for the latch means to cease to be operative so that the abutment means can move to its rest position.

Conveniently the mechanism includes electromagnetic retraction means for retracting said abutment means from said rest position.

Alternatively said retraction means is hydraulically actuated.

Desirably said latch mechanism is a centrifugal mechanism.

Conveniently said centrifugal mechanism extends within a sleeve movable axially relative to said shaft to retract said abutment means.

Preferably said centrifugal mechanism coacts with said sleeve to latch said sleeve in said retracted position.

Preferably said latch mechanism includes at least one bell-crank lever pivotally mounted on said shaft, one limb of said lever swinging radially outwardly of said shaft as said shaft rotates.

Desirably the other limb of said lever is received in a radial recess in said shaft.

Conveniently at least one further bell-crank lever is provided angularly spaced from the first mentioned lever about the axis of said shaft.

Preferably said shaft houses resilient means acting on the or each bell-crank lever to oppose movement of said lever under centrifugal force.

Desirably the free end region of said one limb of the or each bell-crank lever coacts with said sleeve in its retracted position when the rotational speed of said shaft has exceeded a predetermined value, to latch said sleeve in its retracted position.

Conveniently said sleeve carries an annular bearing encircling said shaft and the or each bell-crank lever engages the inner race of said bearing to latch the sleeve in its retracted position.

Preferably a generally radially outwardly extending shoulder of the or each bell-crank lever is engageable with a corresponding radial surface at the end of said inner race and shoulder and/or said surface are undercut so that under the action of said resilient means urging the abutment means to said rest position a self locking action is generated at said shoulder and said surface resisting return of the or each bell-crank lever under the action of said resilient means acting on the or each bell-crank lever.

Desirably in the inoperative position of said centrifugal mechanism a radial clearance exists between the inner surface of said sleeve and said mechanism to permit free axial movement of the sleeve relative to said shaft.

Conveniently said sleeve is the movable armature of an electromagnet.

Alternatively said sleeve is a movable piston of an hydraulic actuator.

Figure 3:
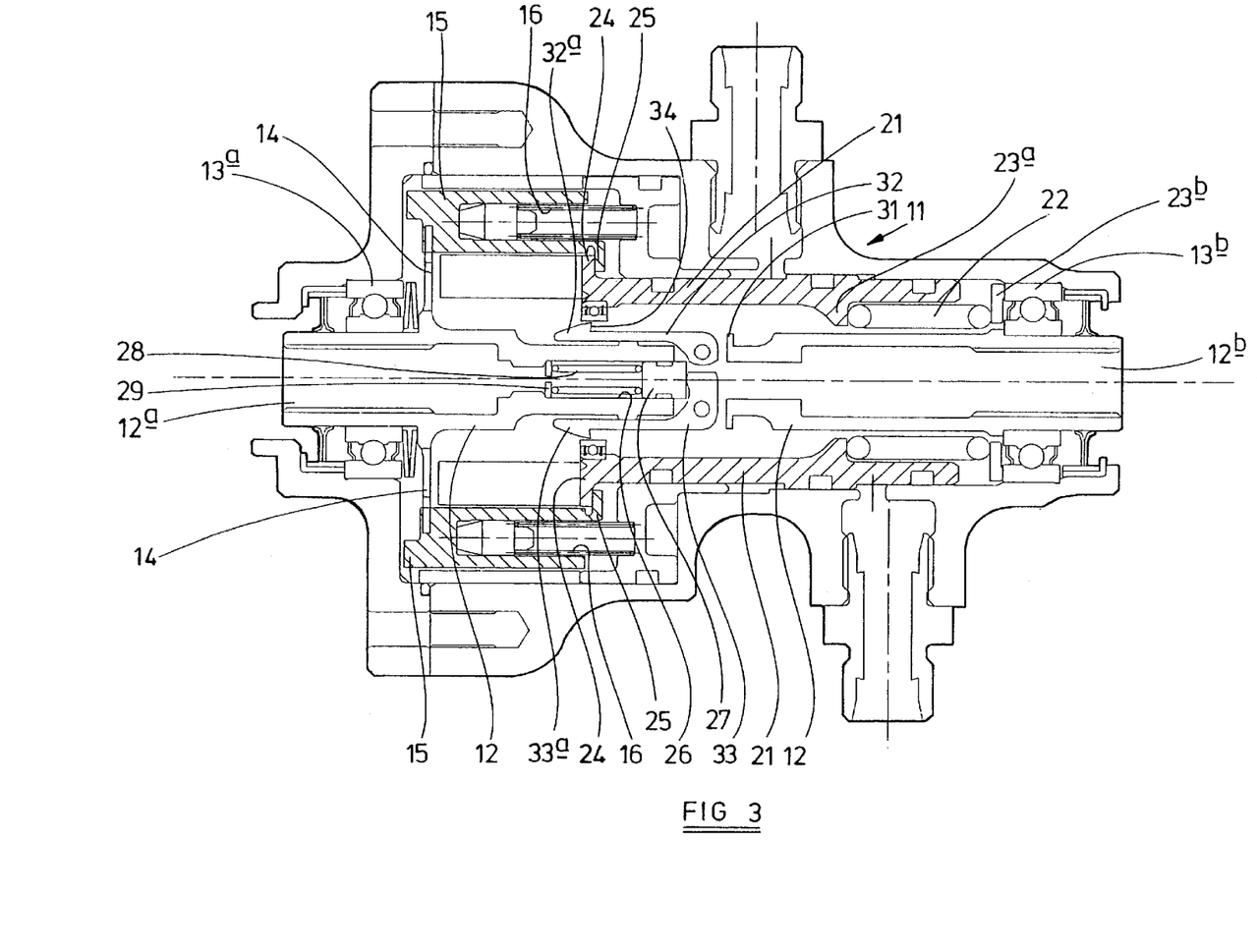
FIG. 3 is a diagrammatic cross-sectional view of a thrust reverser actuator lock mechanism in accordance with one example of the present invention.
Figures 4, 6:
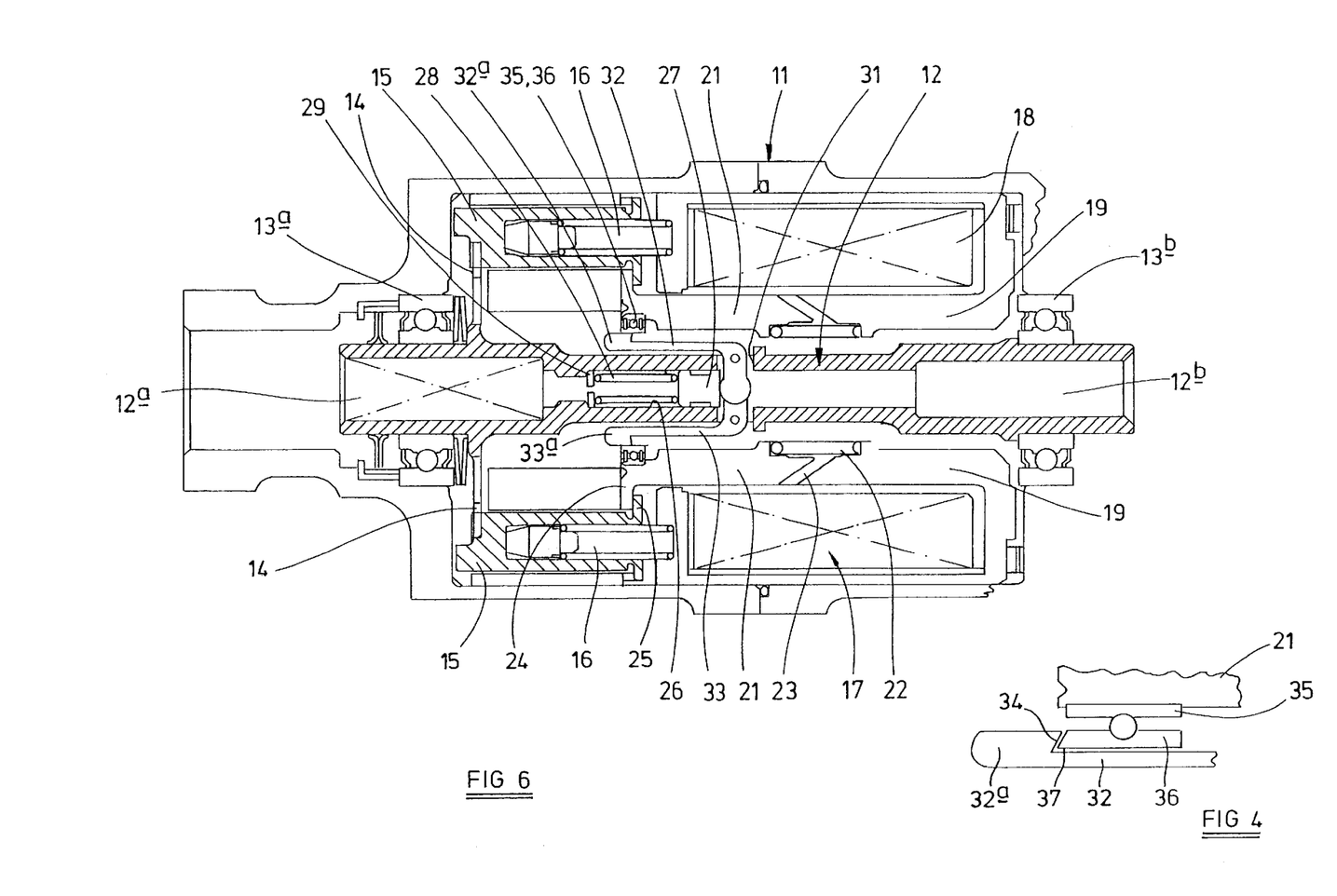
FIGS. 4 and 5 are diagrammatic representations, to an enlarged scale, of part of the mechanism of FIG. 3.
FIG. 6 is a view similar to FIG. 3 of a mechanism in accordance with a second example of the present invention.
Figure 5:
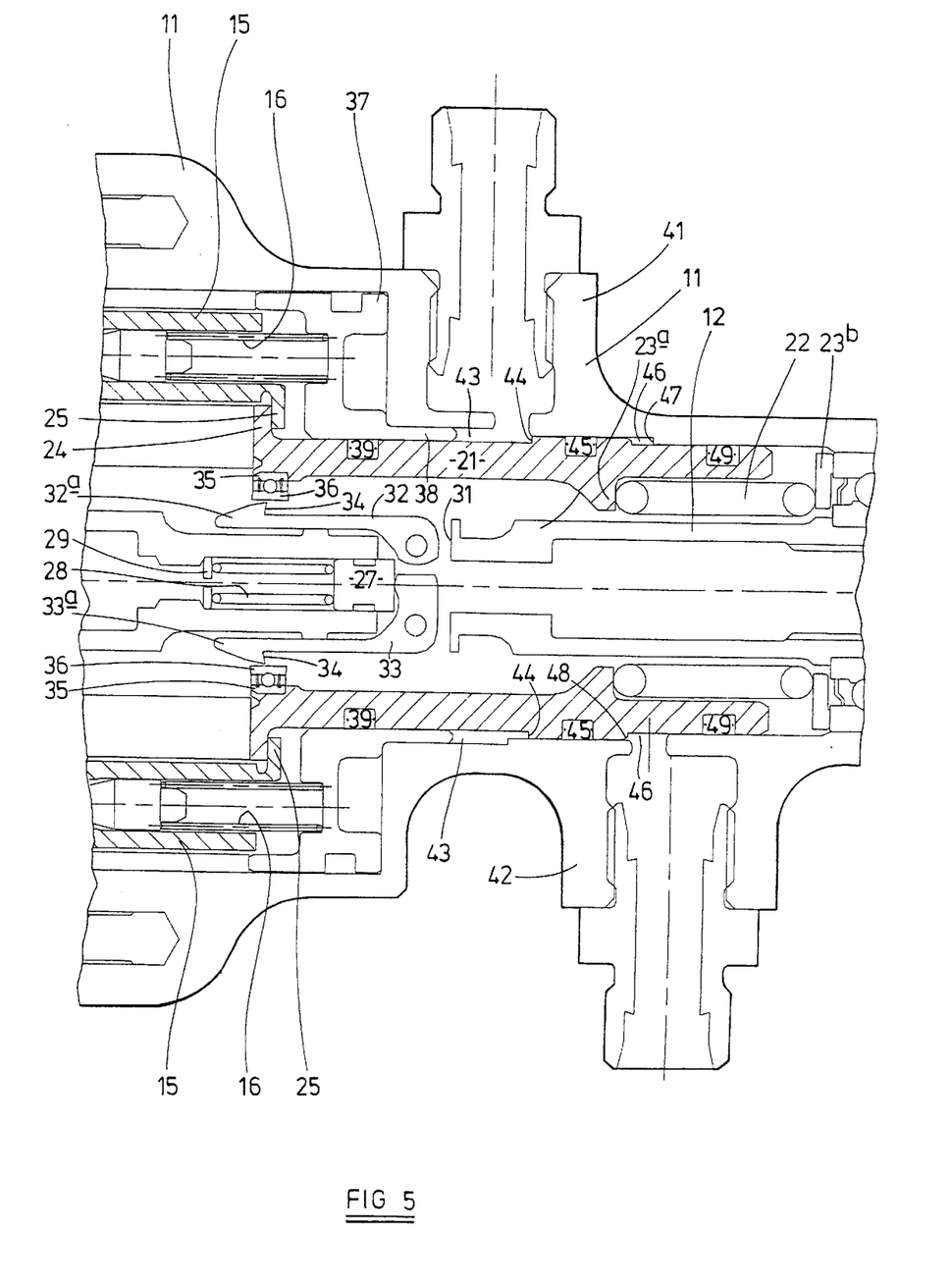

Referring to FIGS. 3, 4 and 5 of the drawings, the lock mechanism includes an elongate, fixed housing 11 rotatably supporting an elongate shaft 12 in ball bearing assemblies 13a, 13b. At one end 12a the shaft 12 is adapted to be drivingly connected to an electric motor or other prime mover for powering the engine thrust reverser mechanism, and at its opposite end 12b the shaft 12 is adapted for driving connection with a thrust reverser actuator, for example a ball screw actuator. The bearings 13 provide a very low friction mounting of the shaft 12 in the fixed housing 11.

Adjacent the bearing 13a the shaft 12 is integrally formed with three equiangularly spaced, radially outwardly extending arms 14 which thus rotate with the shaft 12. First and second locking pins 15 are disposed diametrically opposite one another on opposite sides of the axis of the shaft 12 and are slidably received in appropriate mountings in the housing 11. The pins 15 have a forward, rest position in which they intersect the rotational path of the outer end regions of the arms 14. Thus in their rest positions the pins 15 extend between the arms 14 and one of the arms 14 will abut one of the pins 15 if an attempt is made to rotate the shaft 12. The pins thus lock the shaft 12 against rotation relative to the housing 11 when the pins are in their rest positions.

Each of the pins 15 includes a blind, axial bore extending into the pin from the rearward end of the pin, and each bore receives a respective helically wound compression spring 16 acting between the housing 11 and the pin 15 to urge the pin to its forward, rest position (the position illustrated in FIG. 1).

Slidably received within the housing 11 and coaxially receiving the shaft 12 within it is an elongate hollow sleeve 21 defining an hydraulically movable piston. A helically wound compression spring 22 is received within the sleeve 21 and acts between an internal shoulder 23a of the sleeve and an abutment flange 23b fixed to the housing 11 to urge the sleeve 21 to the left in the drawings to a rest position in which the forward end of the sleeve 21 abuts part of the housing 11 slidably receiving the pins 15 (as depicted in FIG. 1).

At its forward end, remote from the end 12b of the shaft 12 the sleeve 21 has a radially outwardly extending flange 24 positioned in front of corresponding radially inwardly extending flanges 25 of the pins 15. It will be recognised therefore that the sleeve 21 is moved from its rest position against the spring 22, the flange 24 abutting the flanges 25 ensures that the pins 15 are retracted against their compression springs 16.

The shaft 12 is formed with an axially extending bore 26 slidably receiving a plunger 27. A compression spring 28 is received within the bore 26 and acts between an abutment 29 in the bore and the plunger 27 to urge the plunger 27 towards the end 12b of the shaft. The bore 26 is intersected by a transverse bore 31 receiving first and second bell-crank levers 32, 33. Each of the levers 32, 33 is pivotally connected to the shaft 12 adjacent the intersection of the limbs of the lever and thus each lever 32, 33 includes a first limb extending radially inwardly of the bore 31, and a second limb which extends axially along the outer surface of the shaft 12 in a forward direction. The innermost ends of the first limbs of the levers 32, 33 are rounded and overlap one another, both rounded ends abutting the end of the plunger 27. It will be recognised that the plunger 27, being urged by the spring 28 to move towards the right (as drawn) abuts the first limbs of both of the levers 32, 33 and thus urges the levers 32, 33 to pivot in a direction to press their second limbs against the outer surface of the shaft 12.

The second limb of each of the levers 32, 33 is elongate, and is formed at its free end with a head region 32a, 33a, having an outwardly extending undercut shoulder 34. The second limbs of the levers 32, 33 extend between the outer surface of the shaft 12 and the inner surface of the sleeve 21. There is clearance, in the rest position of the levers 32, 33, between the first limbs of the levers and the inner surface of the sleeve 21. Moreover, in the rest position of the sleeve 21 the free ends of the heads 32a, 33a of the levers protrude beyond the end of the sleeve 21, but the under-cut shoulders 34 of the levers lie within the confines of the sleeve 21.

At its forward end the sleeve 21 receives a ball bearing assembly including an outer race 35 which is secured to the inner surface of the sleeve 21, and an inner race 36 through which the first limbs of the levers 32, 33 extend. In the rest position of all of the components (as illustrated in FIG. 1) the heads 32a, 33a of the levers 32, 33 do not engage the inner surface of the inner race 36 as a small clearance (not shown) is provided.

An annular collar 37 is received within the housing 11 and is rigidly secured thereto to define the reaction point against which the springs 16 of the pins 15 abut. At its inner periphery the collar 37 defines a hollow cylindrical support tube 38 within which a region of the sleeve 21 is slidably received. An annular seal 39 is provided in an annular groove in the sleeve 21 and makes sliding contact with the inner cylindrical surface of the collar 37.

The housing 11 is shaped to define first and second radially extending, axially spaced hydraulic pressure unions 41, 42 by way of which hydraulic fluid under pressure can be admitted to the interior of the housing. The union 41 communicates with an annular chamber 43 defined between the outer cylindrical surface of the sleeve 21, the inner cylindrical surface of the housing 11, and bounded at one end by the tube 38 of the collar 37 and at the opposite end by a radially extending shoulder 44 on the sleeve 21. The seal 39 prevents leakage along the interface of the sleeve and the collar in one direction, and a similar seal 45 received in a circumferential groove of the sleeve 21 and in sliding engagement with the inner surface of the housing 11 seals the interface of the sleeve 21 and the housing 11 in the opposite axial direction.

The union 42 communicates with a second annular chamber 46 defined between the outer surface of the sleeve 21 and the inner surface of the housing 11 and bounded at one end by a radially inwardly extending shoulder 47 of the housing and at the opposite end by a radially outwardly extending shoulder 48 of the sleeve 21. The seal 45 seals the sliding interface between the sleeve 21 and the housing 11 in one direction, and a similar seal 49 seals the sliding interface in the opposite direction. It will be recognised that hydraulic fluid under pressure admitted to the chamber 43 by way of the union 41 acts on the shoulder 44 to urge the sleeve 21 to slide from its rest position against the action of the spring 22. Similarly it will be recognised that the application of hydraulic fluid under pressure to the chamber 46, by virtue of the fluid acting against the shoulder 48, urges the sleeve 21 to move to the left in the drawing assisting the action of the spring 22.

In use the hydraulic operating circuit associated with the lock mechanism includes a high pressure line and a low pressure (drain) line. The union 42 is permanently connected to the drain line, and a change-over valve determines whether the union 41 is connected to the high pressure line or the drain line. The pressure in the high pressure line is sufficient, when acting against the shoulder 44 of the sleeve 21, to drive the sleeve 21 against the action of the spring 22 and the springs 16 to move the sleeve 21 and the pins 15 to the right in the drawings until the flanges 25 of the pins 15 abut the collar 37.

The operation of the lock mechanism is as follows. With the parts in their rest positions as shown in FIG. 1, if an attempt is made to rotate the shaft 12 then one of the arms 14 will abut one of the pins 15 to prevent such rotation. In order to free the shaft for rotation the change-over valve is operated (usually electrically) to admit high pressure hydraulic fluid to the chamber 43 and thus to retract the sleeve 21 against the spring 22 and simultaneously retracting the pins 15 against their return springs 16 so moving the pins 15 out of the orbit of the arms 14 and freeing the shaft 12 for rotation. Retraction of the sleeve 21 to the fullest extent permitted by the flanges 25 of the pins 15 abutting the collar 37 of the housing 11, carries the bearing assembly, and in particular the inner race 36 of the bearing assembly, axially beyond the under-cut shoulders 34 of the heads 32a, 33a of the levers. Accordingly, as the shaft 12 rotates carrying the levers 32, 33 with it, the heads 32a, 33a of the levers can to move radially outwardly under centrifugal force, pivoting the levers 32, 33 relative to the shaft 12 in a direction to displace the plunger 27 against the action of its return spring 28. Thus the heads 32a, 33a assume a position in which the shoulders 34 overlie the axial end surface of the race 36 and should the levers 32, 33 actually engage the race 36 this will not matter since the inner race 36 can rotate with the shaft 12 relative to the outer race 35 which is anchored to the sleeve 21.

Provided that the pressure in the chamber 43 is maintained then the pivoting movement of the levers 32, 33 against the action of the spring 28 is irrelevant since the sleeve 21 and pins 15 will be retained in the fully retracted position. However, if the pressure supply to the chamber 43 is interrupted while the shaft 12 is rotating then the sleeve 21 and pins 15 will be returned towards their rest positions by their return springs. However, only a small movement of the sleeve and the pins towards their rest positions will occur before the axial end of the race 36 abuts the shoulders 34 of the levers 32, 33 and further return movement of the pins and the sleeve is arrested. Thus failure in the pressure supply while the shaft 12 is rotating does not result in damage to the pins 15 and arms 14 and does not result in rotation of the shaft 12 being arrested.

It will be recalled that the shoulders 34 of the heads of the levers 32, 33 are not radial, but are under-cut. The axial end surface 36a of the race 36 is disposed parallel to the shoulders 34 so that the latching of the sleeve 21 and pins 15 in a retracted position by the levers 32, 33 is self-locking. Specifically, the force of the return springs 16, 22 of the pins 15 and the sleeve 21 urging the inclined axial end 37 of the race 36 against the inclined shoulder 34 of each lever is sufficient to retain each lever in its outward position against the action of the spring 28 even in the event that the shaft 12 comes to rest, and there is no centrifugal force urging the heads 32a, 33a of the levers outwardly. In order to release the latching action of the levers it is necessary for both the shaft 12 to have ceased or virtually ceased rotation, and for the chamber 43 to have been pressurised at least momentarily to move the sleeve 21 to retract the race 36 away from the shoulders 34 thereby permitting the levers 32, 33 to be pivoted back to their rest positions by the spring 28. Thereafter de-pressurisation of the chamber 43 will restore the sleeve 21 and pins 15 to their rest positions since the shoulders 34 will no longer be in the path of movement of the inner race 36.

It will be recognised that at very low rotational speeds of the shaft 12 the levers 32, 33 will not have been pivoted under centrifugal action to latch the sleeve in a retracted position. Thus should the chamber 43 be de-pressurised the sleeve 21 and the pins 15 can be returned to their rest positions. However, the loading imposed by the spring 28 is calculated to be such that the rotational speed of the shaft at which the levers can pivot outwardly under centrifugal force is so low that restoring the pins 15 to their rest positions obstructing the rotational movement of the shaft 12 will not result in damage.

The normal operation of the lock mechanism is that the chamber 43 will be maintained pressurised until the shaft 12 is stationary in its rest position, that is to say with the associated thrust reverser fully stowed. If the chamber 43 has been maintained pressurised through the whole of the operation then the levers 32, 33 will return to their rest positions under the action of the spring 28 without ever having acted upon the sleeve 21, and de-pressurisation of the chamber 43 at that point will allow the sleeve 21 and the pins 15 to return to their rest positions so that the shaft 12 is thereafter locked against further rotation until the chamber 43 is next pressurised.

As mentioned above the change-over valve will connect the chamber 43 either to the high pressure line or to the drain line. It is important that the chamber 43 is connected to the drain line when it is not intended that the chamber 43 shall be pressurised since such a connection will allow hydraulic fluid to drain from the chamber 43 as the sleeve 21 is moved towards its rest position under the action of the spring 22. However, it is recognised that the drain line may also serve other hydraulic actuators associated with the aircraft. It is known that discharge of high pressure fluid into the drain line, from elsewhere in the hydraulic system of the aircraft, can give rise to a transient high pressure pulse in the drain line. Clearly it is extremely undesirable that such a transient and spurious high pressure pulse should cause movement of the sleeve 21 against the action of the spring 22 since this would retract the locking pins 15 and permit rotation of the shaft 12. If such a spurious pulse coincided with an unintentional rotation of the shaft 12 the locking mechanism could become latched in its inoperative position unintentionally. The provision of the chamber 46 permanently connected to the drain line overcomes this problem. Specifically, the effective area of the shoulder 48 of the sleeve 21 is equal to the effective area of the shoulder 41 of the sleeve 21, but of coarse is oppositely presented. Thus if, when the change-over valve connects the chamber 43 to the drain line, there is a transient high pressure pulse in the drain line, then that pulse will be presented simultaneously to the shoulders 44 and 48 of the sleeve 21 with the result that the next effect of the pulse on the sleeve 21 is zero and the sleeve 21 thus remains in its rest position under the action of the spring 22. Naturally the union 42 and the chamber 46 could be dispensed with if, when the chamber 43 is not intended to be connected to the high pressure line, the change-over valve connects the chamber 43 to a dedicated drain line which can be guaranteed to be free of transient pressure pulses.

The embodiment illustrated in FIG. 6 is operated electrically rather than hydraulically but its operating principles are similar to those described above in relation to FIGS. 3 to 5. In place of the hydraulic actuation system of FIGS. 3 to 5, FIG. 6 illustrates, secured within the housing 11 at its end remote from the pins 15, and encircling the shaft 12, a hollow, cylindrical, electromagnet assembly 17. The assembly 17 includes a hollow cylindrical electromagnet winding 18 partly enclosed in a ferro-magnetic yoke including a hollow cylindrical pole piece 19 extending within the winding 18 from the rearward end of the assembly 17 adjacent the bearing 13b forwardly towards the bearing 13a. The electromagnet assembly 17 further includes a ferro-magnetic sleeve defining the electromagnet armature or plunger 21. The armature 21 is coaxial with the shaft 12, and extends into the winding 18 from the front end thereof toward the free end of the pole piece 19. The armature 21 is mounted for axial sliding movement towards and away from the pole piece 19 and a compression spring 22 urges the armature 21 away from the pole piece 19 to a rest position in which its end remote from the pole piece 19 abuts the part of the housing 11 supporting the pins 15. An air gap 23 is defined between the armature and the pole piece in the rest position of the armature. It will be recognised that energisation of the winding 18 produces a magnetic flux flow across the air gap 23 whereby the armature 21 is magnetically attracted towards the pole piece 19 against the action of the spring 22.

At its forward end, remote from the pole piece 19, the armature 21 has a radially outwardly extending flange 24 positioned in front of corresponding radially inwardly extending flanges 25 of the pins 15. It will be recognised therefore than when the armature 21 is moved to close the air gap 23 the flange 24 abutting the flanges 25 ensures that the pins 15 are retracted against their compression springs by the movement of the armature 21 to close the air gap 23.

As described above, the shaft 12 is formed with an axially extending bore 26 slidably receiving a plunger 27. A compression spring 28 is received within the bore 26 and acts between an abutment 29 in the bore and the plunger 27 to urge the plunger 27 towards the end 12b of the shaft. The bore 26 is intersected by a transverse bore 31 receiving first and second bell-crank levers 32, 33. Each of the levers 32, 33 is pivotally connected to the shaft 12 adjacent the intersection of the limbs of the lever and thus each lever 32, 33 includes a first limb extending radially inwardly of the bore 31, and a second limb which extends axially along the outer surface of the shaft 12 in a forward direction. The innermost ends of the first limbs of the levers 32, 33 are rounded and overlap one another, both rounded ends abutting the end of the plunger 27. It will be recognised that the plunger 27, being urged by the spring 28 to move towards the right (as drawn) abuts the first limbs of both of the levers 32, 33 and thus urges the levers 32, 33 to pivot in a direction to press their second limbs against the outer surface of the shaft 12.

The second limb of each of the levers 32, 33 is elongate, and is formed at its free end with a head region 32a, 33a, having an outwardly extending under-cut shoulder 34. The second limbs of the levers 32, 33 extend between the outer surface of the shaft 12 and the inner surface of the armature 21. There is clearance, in the rest position of the levers 32, 33, between the first limbs of the levers and the inner surface of the armature 21. Moreover, in the rest position of the armature 21 the free ends of the heads 32a, 33a of the levers protrude beyond the end of the armature 21, but the under-cut shoulders 34 of the levers lie within the confines of the armature 21.

At its forward end the armature 21 receives a ball bearing assembly including an outer race 35 which is secured to the inner surface of the armature 21, and an inner race 36 through which the first limbs of the levers 32, 33 extend. In the rest position of all of the components (as illustrated in FIG. 1) the heads 32a, 33a of the levers 32, 33 do not engage the inner surface of the inner race 36 as a small clearance (not shown) is provided.

The operation of the lock mechanism is as follows. With the parts in their rest position as shown in FIG. 1, if an attempt is made to rotate the shaft 12 then one of the arms 14 will abut one of the pins 15 to prevent such rotation. In order to free the shaft for rotation the winding 18 is energised thus retracting the armature 21 against the spring 22 and simultaneously retracting the pins against their return springs so moving the pins 15 out of the orbit of the arms 14 and freeing the shaft 12 for rotation. Retraction of the armature 21 to the fullest extent permitted either by closure of the air gap 23 or by the rear ends of the pins 15 abutting an internal wall of the housing 11, carries the bearing assembly, and in particular the inner race 36 of the bearing assembly, axially beyond the under-cut shoulders 34 of the heads 32a, 33a of the levers. Accordingly, as the shaft 12 rotates carrying the levers 32, 33 with it, the heads 32a, 33a of the levers tend to move radially outwardly under centrifugal force, pivoting the levers 32, 33 relative to the shaft 12 in a direction to displace the plunger 27 against the action of its return spring 28. Thus the heads 32a, 33a assume a position in which the shoulders 34 overlie the axial end surface of the race 36 and should the levers 32, 33 actually engage the race 36 this will not matter since the inner race 36 can rotate with the shaft 12 relative to the outer race 35 which is anchored to the armature 21.

Providing that the winding 18 is maintained energised then the pivoting movement of the levers 32, 33 against the action of the spring 28 is irrelevant since the armature 21 and pins 15 will be retained in the fully retracted position. However, if the power supply to the winding 18 is interrupted while the shaft 12 is rotating then the armature 21 and pins 15 will be returned towards their rest positions by their return springs. However, only a small movement of the armature and the pins towards their rest positions will occur before the axial end of the race 36 abuts the shoulders 34 of the levers 32, 33 and further return movement of the pins and the armature is arrested. Thus failure in the energisation of the winding 18 while the shaft 12 is rotating does not result in damage to the pins 15 and arms 14 and does not result in rotation of the shaft 12 being arrested.

It will be recalled that the shoulders 34 of the heads of the levers 32, 33 are not radial, but are under-cut. The axial end surface 37 of the race 36 is disposed parallel to the shoulders 34 so that the latching of the armature 21 and pins 15 in a retracted position by the levers 32, 33 is self-locking. Specifically, the force of the return springs of the pins 15 and the armature 21 urging the inclined axial end 37 of the race 36 against the inclined shoulder 34 of each lever is sufficient to retain each lever in its outward position against the action of the spring 28 even in the event that the shaft 12 comes to rest, and there is no centrifugal force urging the heads 32a, 33a of the levers outwardly. In order to release the latching action of the levers it is necessary for both the shaft 12 to have ceased or virtually ceased rotation, and for the winding 18 to have been energised at least momentarily to retract the race 36 away from the shoulders 34 thereby permitting the levers 32, 33 to be pivoted back to their rest positions by the spring 28. Thereafter de-energisation of the winding 18 will restore the armature 21 and pins 15 to their rest positions since the shoulders 34 will no longer be in the path of movement of the inner race 36.

It will be recognised that at very low rotational speeds of the shaft 12 the levers 32, 33 will not have been pivoted under centrifugal action to latch the armature in a retracted position. Thus should the winding 18 be de-energised the armature 21 and the pins 15 can be returned to their rest positions. However, the loading imposed by the spring 28 is calculated to be such that the rotational speed of the shaft at which the levers can pivot outwardly under centrifugal force is so low that restoring the pins 15 to their rest positions obstructing the rotational movement of the shaft 12 will not result in damage.

The normal operation of the lock mechanism is that the winding 18 will be maintained energised until the shaft 12 is stationary in its rest position, that is to say with the associated thrust reverser fully stowed. If the winding 18 has been maintained energised through the whole of the operation then the levers 32, 33 will return to their rest positions under the action of the spring 28 without ever having acted upon the armature 21, and de-energisation of the winding 18 at that point will allow the armature 21 and the pins 15 to return to their rest positions so that the shaft 12 is thereafter locked against further rotation until the winding 18 is next energised.

What is claimed is:

1. A thrust reverser actuator lock mechanism comprising a rotatable shaft, rotation of which in one direction from a rest position drives an associated thrust reverser from a stowed position towards an operative position in use, retractable abutment means having a rest position abutting an element rotatable with the shaft to prevent rotation of the shaft, resilient means urging said abutment means to said position, and, mechanical latch means sensitive to the speed of rotation of said shaft for latching said abutment means in a retracted position against the action of said resilient means when the rotational speed of said shaft exceeds a predetermined value.

2. A thrust reverser actuator lock mechanism as claimed in claim 1 wherein said mechanical latch means co-operates with said abutment means in such a manner that when said latch means latches said abutment means in said retracted position the abutment means must be retracted beyond said latched position and the speed of rotation of the shaft must be below said predetermined value in order for the latch means to cease to be operative so that the abutment means can move to its rest position.

3. A thrust reverser actuator lock mechanism as claimed in claim 1 including electromagnetic retraction means for retracting said abutment means from said rest position.

4. A thrust reverser actuator lock mechanism as claimed in claim 1 including hydraulic retraction means for retracting said abutment means from said rest position.

5. A thrust reverser actuator lock mechanism comprising
a rotatable shaft, rotation of which in one direction from a rest position drives an associated thrust reverser from a stowed position towards an operative position in use,
at least one retractable abutment having a rest position abutting an element rotatable with the shaft to prevent rotation of the shaft,
at least one resilient component urging said at least one abutment to said rest position,
an electromagnetically actuated retractor for retracting said at least one abutment from said rest position, and,
a mechanical latch sensitive to the speed of rotation of said shaft for latching said at least one abutment in a retracted position against the action of said resilient component when the rotational speed of said shaft exceeds a predetermined value, said mechanical latch co-operating said at least one abutment in such a manner that when said latch latches said at least one abutment in said retracted position said at least one abutment must be retracted beyond said latched position and the speed of rotation of the shaft must be below said predetermined value in order for said latch to cease to be operative so that said at least one abutment can move to its rest position.

6. A thrust reverser actuator lock mechanism comprising
a rotatable shaft, rotation of which in one direction from a rest position drives an associated thrust reverser from a stowed position towards an operative position in use,
at least one retractable abutment having a rest position abutting an element rotatable with the shaft to prevent rotation of the shaft,
at least one resilient component urging said at least one abutment to said rest position,
an hydraulically actuated retractor for retracting said at least one abutment from said rest position, and,
a mechanical latch sensitive to the speed of rotation of said shaft for latching said at least one abutment in a retracted position against the action of said resilient component when the rotational speed of said shaft exceeds a predetermined value, said mechanical latch co-operating said at least one abutment in such a manner that when said latch latches said at least one abutment in said retracted position said at least one abutment must be retracted beyond said latched position and the speed of rotation of the shaft must be below said predetermined value in order for said latch to cease to be operative so that said at least one abutment can move to its rest position.

7. A thrust reverser actuator lock mechanism as claimed in claim 1 wherein said latch mechanism is a centrifugal mechanism.

8. A thrust reverser actuator lock mechanism as claimed in claim 7 wherein said shaft and said centrifugal mechanism extend within a sleeve movable axially relative to said shaft to retract said abutment means.

9. A thrust reverser actuator lock mechanism as claimed in claim 8 wherein said centrifugal mechanism coacts with said sleeve to latch said sleeve in said retracted position.

10. A thrust reverser actuator lock mechanism as claimed in claim 7 wherein said latch mechanism includes at least one bell-crank lever pivotally mounted on said shaft, one limb of said lever swinging radially outwardly of said shaft as said shaft rotates.

11. A thrust reverser actuator lock mechanism as claimed in claim 10 wherein the other limb of said lever is received in a radial recess in said shaft.

12. A thrust reverser actuator lock mechanism as claimed in claim 11 wherein at least one further bell-crank lever is provided angularly spaced from the first mentioned lever about the axis of said shaft.

13. A thrust reverser actuator lock mechanism as claimed in claim 12 wherein said shaft houses resilient means acting on said other limb of each bell-crank lever to oppose movement of said lever under centrifugal force.

14. A thrust reverser actuator lock mechanism as claimed in claim 12 wherein the free end region of said one limb of each bell-crank lever coacts with said sleeve in its retracted position when the rotational speed of said shaft has exceeded a predetermined value, to latch said sleeve in its retracted position.

15. A thrust reverser actuator lock mechanism as claimed in claim 14 wherein said sleeve carries an annular bearing encircling said shaft and each bell-crank lever engages the inner race of said bearing to latch the sleeve in its retracted position.

16. A thrust reverser actuator lock mechanism as claimed in claim 15 wherein a generally radially outwardly extending shoulder of the or each bell-crank lever is engageable with a corresponding radial surface at the end of said inner race and said shoulder and/or said surface are undercut so that under the action of said resilient means urging the abutment means to said rest position a self locking action is generated at said shoulder and said surface resisting return of the or each bell-crank lever under the action of said resilient means acting of the or each bell-crank lever.

17. A thrust reverser actuator lock mechanism as claimed in claim 7 wherein in the inoperative position of said centrifugal mechanism a radial clearance exists between the inner surface of said sleeve and said mechanism to permit free axial movement of the sleeve relative to said shaft.

18. A thrust reverser actuator lock mechanism as claimed in claim 7 wherein said sleeve is the movable armature of an electromagnet.

19. A thrust reverser actuator lock mechanism as claimed in claim 7 wherein said sleeve is a movable piston of an hydraulic actuator.

20. A thrust reverser actuator lock mechanism comprising
a rotatable shaft, rotation of which in one direction from a rest position drives an associated thrust reverser from a stowed position towards an operative position in use,
at least one retractable abutment having a rest position abutting an element rotatable with the shaft to prevent rotation of the shaft,
at least one resilient component urging said at least one abutment to said rest position,
an electromagnetically actuated retractor for retracting said at least one abutment from said rest position, and,
a mechanical latch sensitive to the speed of rotation of said shaft for latching said at least one abutment in a retracted position against the action of said resilient component when the rotational speed of said shaft exceeds a predetermined value, said mechanical latch co-operating with said at least one abutment in such a manner that when said latch latches said at least one abutment in said retracted position said at least one abutment must be retracted beyond said latched position and the speed of rotation of the shaft must be below said predetermined value in order for said latch to cease to be operative so that said at least one abutment can move to its rest position, said mechanical latch including at least two bell-crank levers pivotally mounted to said shaft and spring urged to a rest position by spring means housed within said shaft and from which they swing radially outwardly under centrifugal force as said shaft exceeds a predetermined rotational speed, and a sleeve member movable from an axial rest position axially along the axis of said shaft to retract said abutment means, said bell-crank levers being engageable with an axial end surface of said sleeve member when swung radially, outwardly to latch said sleeve member to hold said abutment means in said retracted position.

21. A thrust reverser actuator lock mechanism comprising
a rotatable shaft, rotation of which in one direction from a rest position drives an associated thrust reverser from a stowed position towards an operative position in use,
at least one retractable abutment having a rest position abutting an element rotatable with the shaft to prevent rotation of the shaft,
at least one resilient component urging said at least one abutment to said rest position,
an hydraulically actuated retractor for retracting said at least one abutment from said rest position, and,
a mechanical latch sensitive to the speed of rotation of said shaft for latching said at least one abutment in a retracted position against the action of said resilient component when the rotational speed of said shaft exceeds a predetermined value, said mechanical latch co-operating with said at least one abutment in such a manner that when said latch latches said at least one abutment in said retracted position said at least one abutment must be retracted beyond said latched position and the speed of rotation of the shaft must be below said predetermined value in order for said latch to cease to be operative so that said at least one abutment can move to its rest position said mechanical latch including at least two bell-crank levers pivotally mounted to said shaft and spring urged to a rest position by spring means housed within said shaft and from which they swing radially outwardly under centrifugal force as said shaft exceeds a predetermined rotational speed, and a sleeve member movable from an axial rest position axially along the axis of said shaft to retract said abutment means, said bell-crank levers being engageable with an axial end surface of said sleeve member when swung radially, outwardly to latch said sleeve member to hold said abutment means in said retracted position.

\* \* \* \* \*